US011198078B2

(12) United States Patent
Hinzie et al.

(10) Patent No.: US 11,198,078 B2
(45) Date of Patent: Dec. 14, 2021

(54) CHEMICAL LIQUID MANUFACTURING APPARATUS

(71) Applicant: FUJIFILM Electronic Materials U.S.A., Inc., North Kingstown, RI (US)

(72) Inventors: Bryan Hinzie, Gilbert, AZ (US); Marcia Cole-Yocom, Scottsdale, AZ (US); Michael Barker, Goodyear, AZ (US); Perry Westberg, Goodyear, AZ (US); Yuan Chen, Chandler, AZ (US); Jack Helzer, Chandler, AZ (US)

(73) Assignee: FUJIFILM Electronic Materials U.S.A., Inc., North Kingstown, RI (US)

( * ) Notice: Subject to any disclaimer, the term of this patent is extended or adjusted under 35 U.S.C. 154(b) by 75 days.

(21) Appl. No.: 16/368,866

(22) Filed: Mar. 29, 2019

(65) Prior Publication Data

US 2019/0308117 A1    Oct. 10, 2019

Related U.S. Application Data

(60) Provisional application No. 62/650,448, filed on Mar. 30, 2018.

(51) Int. Cl.
*B01D 36/02* (2006.01)
*B01D 61/08* (2006.01)
*B01D 61/02* (2006.01)

(52) U.S. Cl.
CPC ........... *B01D 36/02* (2013.01); *B01D 61/022* (2013.01); *B01D 61/08* (2013.01); *B01D 2311/2623* (2013.01); *B01D 2317/02* (2013.01); *B01D 2325/42* (2013.01)

(58) Field of Classification Search
CPC .... B01D 2325/42; B01D 36/02; B01D 61/08; B01D 61/022; B01D 2317/02; B01D 2311/2623; B01D 61/142; B01D 2311/25; B01D 15/1871; B01D 15/361; B01D 15/1814
See application file for complete search history.

(56) References Cited

U.S. PATENT DOCUMENTS

| 2007/0000835 A1* | 1/2007 | Gordon | C02F 3/02 |
| | | | 210/603 |
| 2007/0031954 A1* | 2/2007 | Mairal | B01D 61/58 |
| | | | 435/161 |
| 2010/0193438 A1 | 8/2010 | Isomura et al. | |

(Continued)

OTHER PUBLICATIONS

Groen et al Microporous and Mesoporous Materials 60 (2003) 1-17.*

(Continued)

*Primary Examiner* — Krishnan S Menon
(74) *Attorney, Agent, or Firm* — JCIP Global Inc.

(57) ABSTRACT

A chemical liquid manufacturing apparatus, including a first system and a second system, is provided. The first system includes at least one first filtration medium, selected from a first filter, a first ion exchange membrane and a first ion adsorption membrane, wherein the first system is configured to process a material of at least one time. The second system includes at least one second filtration medium, selected from a second filter, a second ion exchange membrane and a second ion adsorption membrane, wherein the second system is configured for recirculation and to process the material of at least two times.

20 Claims, 2 Drawing Sheets

(56) References Cited

U.S. PATENT DOCUMENTS

| | | |
|---|---|---|
| 2010/0264084 A1 | 10/2010 | Midorikawa et al. |
| 2010/0281960 A1* | 11/2010 | Jons .................... B01D 65/102 73/61.71 |
| 2013/0220934 A1 | 8/2013 | Otani et al. |
| 2014/0163264 A1 | 6/2014 | Takahashi et al. |
| 2017/0158635 A1 | 6/2017 | Terashi |

OTHER PUBLICATIONS

R. K. Joshi, et al., "Precise and Ultrafast Molecular Sieving Through Graphene Oxide Membranes" Science, vol. 343, Issue 6172, Feb. 14, 2014, pp. 1-13.

"International Search Report (Form PCT/ISA/210) and Written Opinion of the International Searching Authority (Form PCT/ISA/237) of PCT/US2019/024715," dated Jun. 25, 2019, pp. 1-12.

* cited by examiner

CHEMICAL LIQUID MANUFACTURING APPARATUS

RELATED APPLICATION DATA

The present application claims priority to U.S. Provisional Application No. 62/650,448 filed Mar. 30, 2018, the entire contents of which are incorporated herein by reference.

BACKGROUND

1. Related Field

The present disclosure relates to a chemical liquid manufacturing apparatus and a method of manufacturing a chemical liquid using the same.

2. Description of the Related Art

The semiconductor industry has achieved rapid improvements in integration density of electronic components, which are derived from continuous reductions in the component size. Ultimately, more of the smaller components are afforded to be integrated into a given area. These improvements are mostly due to the development of new precision and high resolution processing techniques.

During the manufacturing of high resolution integrated circuits, various processing liquids will come into contact with a bare wafer or a film-coated wafer. For example, the fabrication of a fine metal interconnection typically involves a procedure of coating a base material with a pre-wetting liquid before the base material is coated with a composite liquid to form a resist film. These processing liquids, containing propriety ingredients and various additives, are known to be a source of contamination of IC wafer.

One can speculate that even if a trace amount of contaminants is mixed into these chemical liquids, such as a wafer pre-wetting liquid or a developer solution, the resulting circuit patterns may have defects. It is known that the presence of very low levels of metal impurities, as low as 1.0 ppt, interferes with the performance and stability of semiconductor devices. And depending on the kind of metallic contaminants, oxide property may deteriorate, inaccurate patterns are formed, electrical performance of semiconductor circuits is impaired, which eventually adversely impact manufacturing yields.

The contamination of impurities, such as metal impurities, coarse particles, organic impurities, moisture, and the like, may be inadvertently introduced in a chemical liquid during various stages of the manufacturing of the chemical liquid. Examples of such include a case where impurities are presented in a raw material, or originated from a container equipment, reaction vessels, or the like used in transporting, storing, or reaction of the raw material or the chemical liquid, or a by-product generated or an unreacted reactant remained when the chemical liquid is manufactured.

Therefore, in order to form highly precise and ultra-fine semiconductor electronic circuits, chemical liquids used in the various stages of semiconductor processing, such as pre-wetting liquid, a resist solution, a developer solution, a stripping solution, a rinsing solution, and a coating solution, etc., necessitate significant quality improvement and must maintain rigorous quality control to avoid incurring defects on the resulting circuit patterns.

SUMMARY

Accordingly, to form highly precise integrated circuits, the demands for ultra-pure chemical liquids, and the quality improvement and control of theses liquids become very critical. Specific key parameters targeted for quality improvement and control include: trace-metal reduction, liquid particle count reduction, on-wafer defect reduction, organic contaminant reduction, etc. All these key parameters are shown to be impacted by the configuration of the processing apparatus and processing parameters including purification media, media preparation, filter sequencing, filter contact time, construction material, and physiochemical properties of the purification media.

In view of the above, the present disclosure is to provide particularly a chemical liquid manufacturing apparatus for preparing a chemical liquid for semiconductor manufacturing, wherein a high purity chemical liquid is produced with the number of unwanted particulates and the amount of metallic impurities in the chemical liquid managed within predetermined ranges. Hence, the occurrence of residue and/or particle defects is suppressed and the yield of semiconductor wafer is improved.

In accordance with some embodiments of the present disclosure, a chemical liquid manufacturing apparatus includes at least a first system and a second system, wherein each of the first and second system is configured to process a material. The first system includes at least one first filtration medium selected from a first filter, a first ion exchange membrane and a first ion adsorption membrane, and the at least one first filtration medium is configured to process the material of at least once; and the second purification system includes at least one second filtration medium selected from at least a second filter, a second ion exchange membrane, and a second ion adsorption membrane, wherein the at least one second filtration medium is configured for a recirculation and to process the material for at least twice.

According to certain exemplary embodiments, the first system is configured for a single pass.

In accordance with alternative embodiments of the present disclosure, a chemical liquid manufacturing apparatus for processing a material includes at least a first system and a second system. The first system includes at least one first filtration medium, selected from at least one first filter, a first ion exchange membrane, and a first ion adsorption membrane, wherein the first system is configured to process the material of at least one time; and the second system includes at least one second filtration medium, selected from at least one second filter, a second ion exchange membrane, and a second ion adsorption membrane, wherein the second system is configured for a recirculation and to process the material of at least two times.

According to certain exemplary embodiments, there are two or more first filters, and the two or more first filters are preferably different in properties. According to yet certain exemplary embodiments, there are two second filters, and the two second filters are preferably different in properties.

In accordance with yet alternative embodiments of the present disclosure, a chemical liquid manufacturing apparatus includes at least a first system and a second system. The first system includes one or plural first purification media; and when the first system includes plural first purification media, at least two of first purification media are different in function, pore size or material. The second system includes one or plural second purification media, and when the second system includes plural second purification media, at least two of the second purification media are different in function, pore size or material. The first system is configured to process a material of at least one time and the second system is configured for a recirculation and to process the material of at least two times.

According to the present disclosure, a chemical liquid manufacturing apparatus, having multi-functional purification media that combine adsorption, filtration, ion exchange, etc., is used to effectively remove a wide range of organic and inorganic contaminants from an aqueous and solvent based solution used in preparing high-purity chemical liquids applied in semiconductor manufacturing.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides different embodiments or examples, for implementing various features of the current subject matter. Specific examples of components and arrangements are described below to simplify the present disclosure. These are merely examples and are not intended to be limiting. For example, when the term "solvent(s)" is used, unless otherwise noted, it may refer to a single solvent or a combination of two or more solvents.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the present disclosure, a numerical range indicated by using a term "to" means a range which includes numerical values described before and after the term of "to", as a lower limit value and an upper limit value.

In the present disclosure, "ppm" means "parts-per-million ($10^{-6}$)", "ppb" means "parts-per-billion ($10^{-9}$)" and "ppt" means "parts-per-trillion ($10^{-12}$)".

In the present disclosure, 1 Å (angstrom) corresponds to 0.1 nm (nanometer) and 1 μm (micron) corresponds to 1000 nm.

<Processing Target>

Prior to being subjected to a purification process, a chemical liquid may contain an undesirable amount of impurities and contaminants. A pre-purified chemical liquid is referred herein in the present disclosure as "processing target" or "processing target material". After the processing target is being processed by the chemical liquid manufacturing apparatus of the present disclosure, substantial amounts of contaminants and impurities are removed from the processing target, and a chemical liquid is produced with impurities and contaminants managed and limited within predetermined ranges.

<Chemical Liquid>

In the present disclosure, a chemical liquid includes an organic solvent and a predetermined amount of impurities. A chemical liquid may include a processing solution used in semiconductor manufacturing, such as a pre-wetting liquid, a developer solution, a rinsing liquid, a cleaning solution, a stripping solution and the like, and a raw component used for the synthesis of the processing solution.

<Organic Solvent>

In the present disclosure, the chemical liquid includes an organic solvent. The type of organic solvent is not particularly limited, but well-known organic solvents are applicable. The content of the organic solvent the chemical liquid is not particularly limited, but the organic solvent is included as the main component. Specifically, the content of the organic solvent is equal to or greater than 98 mass % with respect to the total mass of the chemical liquid. In certain embodiments, the content of the organic solvent is equal to or greater than 99 mass % with respect to the total mass of the chemical liquid. In other embodiments, the content of the organic solvent is equal to or greater than 99.5 mass % with respect to the total mass of the chemical liquid. In yet other embodiments, the content of the organic solvent is equal to or greater than 99.8 mass % with respect to the total mass of the chemical liquid. The upper limit value thereof is not particularly limited, but it is in general that the upper limit value thereof is equal to or smaller than 99.99 mass %.

The organic solvent may be singly used or may be used in combination of two kinds or more thereof. In a case where a combination of two kinds or more of organic solvents is used, it is preferable that the total content thereof is in the above range.

The content of the organic solvent in the chemical liquid can be measured by using a gas chromatography mass spectrometry (GCMS) device.

The boiling point of the organic solvent is not particularly limited. However, the boiling point of the organic solvent is preferably lower than 200° C. from a point of improving manufacturing yield of a semiconductor chip. In this disclosure, the boiling point means a boiling point at 1 atm.

The organic solvent is not particularly limited. Examples of the organic solvent include methanol, ethanol, 1-propanol, isopropanol, n-propanol, 2-methyl-1-propanol, n-butanol, 2-butanol, tert-butanol, 1-pentanol, 2-pentanol, 3-pentanol, n-hexanol, cyclohexanol, 2-methyl-2-butanol, 3-methyl-2-butanol, 2-methyl-1-butanol, 3-methyl-1-butanol, 2-methyl-1-pentanol, 2-methyl-2-pentanol, 2-methyl-3-pentanol, 3-methyl-1-pentanol, 3-methyl-2-pentanol, 3-methyl-3-pentanol, 4-methyl-1-pentanol, 4-methyl-2-pentanol, 2-ethyl-1-butanol, 2,2-dimethyl-3-pentanol, 2,3-dimethyl-3-pentanol, 2,4-dimethyl-3-pentanol, 4,4-dimethyl-2-pentanol, 3-ethyl-3-heptanol, 1-heptanol, 2-heptanol, 3-heptanol, 2-methyl-2-hexanol, 2-methyl-3-hexanol, 5-methyl-1-hexanol, 5-methyl-2-hexanol, 2-ethyl-1-hexanol, methyl cyclohexanol, trimethyl cyclohexanol, 4-methyl-3-heptanol, 6-methyl-2-heptanol, 1-octanol, 2-octanol, 3-octanol, 2-propyl-1-pentanol, 2,6-dimethyl-4-heptanol, 2-nonanol, 3,7-dimethyl-3-octanol, ethylene glycol, propylene glycol, diethyl ether, dipropyl ether, diisopropyl ether, butyl methyl ether, butyl ethyl ether, butyl propyl ether, dibutyl ether, diisobutyl ether, tert-butyl methyl ether, tert-butyl ethyl ether, tert-butyl propyl ether, di-tert-butyl ether, dipentyl ether, diisoamyl ether, cyclopentyl methyl ether, cyclohexyl methyl ether, bromomethyl methyl ether, α,α-dichloromethyl methyl ether, chloromethyl ethyl ether, 2-chloroethyl methyl ether, 2-bromoethyl methyl ether, 2,2-dichloroethyl methyl ether, 2-chloroethyl ethyl ether, 2-bromoethyl ethyl ether, (±)-1,2-dichloroethyl ethyl ether, 2,2,2-trifluoroethyl ether, ethyl vinyl ether, butyl vinyl ether, allyl ethyl ether, allyl propyl ether, allyl butyl ether, diallyl ether, 2-methoxypropene, ethyl-1-propenyl ether, cis-1-bromo-2-ethoxyethylene, 2-chloroethyl vinyl ether, allyl-1,1,2,2-tetrafluoroethyl ether, octane, isooctane, nonane, decane, methylcyclohexane, decalin, xylene, ethylbenzene, diethylbenzene, cumene, second-butylbenzene, cymene, dipentene, methyl pyruvate, propylene glycol monomethyl ether, propylene glycol monoethyl ether, propylene glycol monopropyl ether, propylene glycol monomethyl ether acetate, ethyl lactate, methyl methoxypropionate, cyclopentanone, cyclohexanone, butyl acetate, γ-butyrolactone, isoamyl acetate, chloroform, dichloromethane, 1,4-dioxane, hexyl alcohol, 2-heptanone, isoamyl acetate, and tetrahydrofuran.

In certain embodiments of the present disclosure, the chemical liquid is a pre-wetting liquid. The type of pre-wetting liquid is not particularly limited. Specific examples of a pre-wetting liquid include at least one of cyclopentanone (CyPe), cyclohexanone (CyH), propylene glycol monomethyl ether (PGME), propylene glycol monoethyl ether (PGEE), propylene glycol monomethyl ether acetate (PGMEA), propylene glycol monopropyl ether (PGPE), ethyl lactate (EL). In other embodiments, the chemical liquid may be a developer solution such as butyl acetate, or a rinsing liquid such as 4-methyl-2-pentanol (MIBC).

<Impurities>

Impurities contained in a processing target and/or a chemical liquid include metallic impurities, particles, and others such as organic impurities, moisture, etc.

<Metallic Impurities>

The most common metallic impurities include heavy metals such as iron (Fe), aluminum (Al), chromium (Cr), nickel (Ni) and ionic metals such as sodium (Na) and calcium (Ca). Depending on the type of metal, metal impurities deteriorate oxide integrity, degrade MOS gate stacks, reduce lifetime of devices, etc. In a chemical liquid prepared by the chemical liquid manufacturing apparatus of the present disclosure, the total trace metal content is preferred to be within a predetermined range of 0 to 150 ppt in mass.

In this disclosure, metal impurities refer to metal impurities that are provided in a form of a solid (metal simplex, particulate metal-containing compound, and the like).

In this disclosure, the total trace metal in a chemical liquid is measured by inductively coupled plasma mass spectrometry (ICP-MS) using a Fujifilm developed method. The OWMP (on-wafer metal particle) is determined by inspecting the wafer with a combination of a laser-based inspection system and an EDX (energy dispersive x-ray) inspection. The measurement methods of the total trace metal using ICP-MS and the on-wafer metal particle (OWMP) using laser and EDX are as described in the examples below.

<Particles>

In the present disclosure, the counting targets which have a size of 0.03 μm or greater are referred to as "particles". The number of "particles" in a liquid medium are to be countered by a light scattering type in-liquid particle counter and is referred as LPC (liquid particle count).

Examples of particles include dust, dirt, organic solid matters, and inorganic solid matters. The particles also may include impurities of colloidalized metal atoms. The type of the metal atoms that are easily colloidalized is not particularly limited, and may include at least one metal atom selected from the group consisting of Na, K, Ca, Fe, Cu, Mg, Mn, Li, Al, Cr, Ni, Zn, and Pb. In a chemical liquid prepared by the chemical liquid manufacturing apparatus of the present disclosure, the total content of the particles having a size of 0.03 μm or more is preferred to be within a predetermined range of 100 or less per 1 ml of the chemical liquid.

<Organic Impurities>

Organic impurities mean a compound which is different from the organic solvent as the main component provided in the chemical liquid and refer to organic matter which is contained in the content of 5000 mass ppm or smaller with respect to the total mass of the chemical liquid corresponds to the organic impurities and does not correspond to the organic solvent.

Volatile organic compounds are present in ambient air even inside a clean-room. Some of the organic impurities originate from the shipping and storage equipment, while some are presented in a raw material from the start. Other examples of organic impurities include a by-product generated when the organic solvent is synthesized and/or an unreacted reactant.

The total content of the organic impurities in the chemical liquid is not particularly limited. From a point of improving the manufacturing yield of a semiconductor device, the total content of the organic impurities is preferably 0.1 to 5000 mass ppm, more preferably 1 to 2000 mass ppm, further preferably 1 to 1000 mass ppm, particularly preferably 1 to 500 mass ppm, and most preferably 1 to 100 mass ppm, with respect to the total mass of the chemical liquid.

The content of the organic impurities in the chemical liquid can be measured by using a gas chromatography mass spectrometry (GCMS) device.

<Moisture (Water)>

Moisture has a destabilizing effect on the chemical and physical conditions of semiconductor surfaces. Moisture may come from the ambient air or a residue from a wet process. The moisture may be water contained inevitably in the raw material contained in the chemical liquid, or may be water inevitably contained or deliberately introduced at the time of manufacturing the chemical liquid.

The content of the water in the chemical liquid is not particularly limited. Generally, the content of the water is preferably equal to or smaller than 2.0 mass %, more preferably equal to or smaller than 1.0 mass %, and further preferably smaller than 0.5 mass %, with respect to the total mass of the chemical liquid. If the content of the water in the chemical liquid is equal to or smaller than 1.0 mass %, the manufacturing yield of a semiconductor chip is more improved. A lower is not particularly limited, but may be about 0.01 mass % in many cases. In manufacturing, it is difficult to set the content of the water to be equal to or smaller than the above value.

The content of the water means a moisture content may be measured by using a device which uses the Karl Fischer moisture measurement method as a measurement principle.

In the following, the embodiments of the present disclosure describe an exemplary chemical liquid manufacturing apparatus and an exemplary manufacturing method of a chemical liquid using the same. The chemical liquid manufacturing apparatus comprises at least a plurality of material treatment systems such that the number of unwanted particulates (particles) and the amount of metallic impurities in the chemical liquid prepared using the chemical liquid manufacturing apparatus are limited within predetermined ranges. Hence, the occurrence of residue and/or particle defects is suppressed and the yield of semiconductor wafer is improved.

<Chemical Liquid Manufacturing Apparatus>

Figure 1:
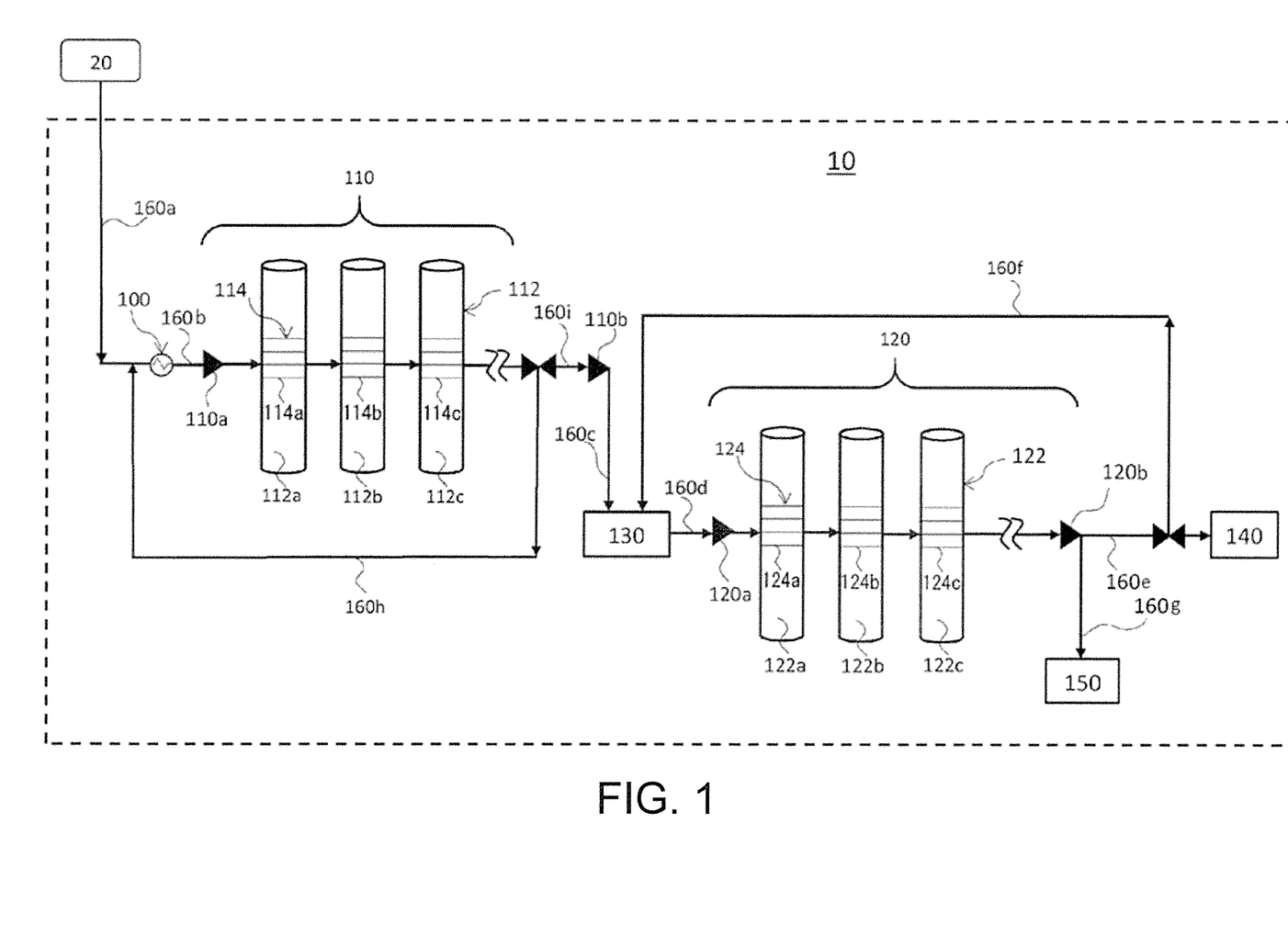
FIG. 1 is a schematic diagram showing a configuration of an exemplary chemical liquid manufacturing apparatus according to some embodiments of the present disclosure.

FIG. 1 is a schematic diagram showing a configuration of an exemplary chemical liquid manufacturing apparatus according to some embodiments of the present disclosure. As shown in FIG. 1, the chemical liquid manufacturing apparatus 10 is connected to a processing target supply unit 20 configured to hold or transport a material, for example a processing target, to be processed by the chemical liquid manufacturing apparatus 10 to produce a chemical liquid wherein the number of unwanted particulates (particles) and the amount of metallic impurities in a chemical liquid are managed within predetermined ranges. The processing target supply unit 20 is not particularly limited as long as it continuously or intermittently supplies the processing target material to the chemical liquid manufacturing apparatus 10. The processing target supply unit 20 may include a material receiving tank, a sensor such as a level gauge (not shown), a pump (not shown), a valve for controlling the flow of the processing target material (not shown), etc. In FIG. 1, the chemical liquid manufacturing apparatus 10 is connected to one processing target supply unit 20. However, the present disclosure is not limited as such. In some exemplary embodiments, a plurality of processing target supply units 20 is provided in parallel for each type of processing target materials to be processed by the chemical liquid manufacturing apparatus 10.

The processing target material may include a raw material used in the preparation of, for example, a processing liquid applied in semiconductor manufacturing, such as a pre-wetting liquid, a developer solution, a rinsing liquid, a cleaning solution, a stripping solution and the like. In the following description, unless otherwise noted, the term "preparation" of a specific material is used to mean a case where a specific material or a chemical liquid as in most embodiments of this disclosure is provided by, for example, purifying, reacting or mixing of the processing target material. The processing target material may be synthesized in house or commercially available via purchasing from a supplier.

In certain embodiments of the present disclosure, the processing target material is a raw organic solvent used in the preparation of a pre-wetting liquid. For example, the raw organic solvent is processed by the chemical liquid manufacturing apparatus 10 to form an ultra-pure pre-wetting liquid, for example, high purity grade cyclohexanone (CyH), cyclopentanone (CyPe), ethyl lactate (EL), propylene glycol monomethyl ether (PGME), propylene glycol monoethyl ether (PGEE), propylene glycol monomethyl ether acetate (PGMEA), propylene glycol monopropyl ether (PGPE), etc., or a combination thereof.

As shown in FIG. 1, the chemical liquid manufacturing apparatus 10 at least includes one heat exchanger 100 for setting the temperature of the processing target material to an optimal processing range, wherein the heat exchanger 100 is connected to the processing target supply unit 20 directly or indirectly, for example, through an introduction conduit 160a; a first material treatment system 110 coupled to the heat exchanger 100 via a first transfer conduit 160b, wherein the first material treatment system 110 includes one or plural filtration media (solid horizontal lines designated by the reference numeral 114), and the first transfer conduit 160b is connected between the heat exchanger 100 and, for example, a supply port 110a of the first material treatment system 110.

In certain exemplary embodiments, the one or plural filtration media 114 may be compartmentalized and contained in one or plural housings 112, respectively. For example, the first material treatment system 110 may include at least one housing 112 selected from a first housing 112a, a second housing 112b, a third housing 112c, and the at least one housing 112 includes and accommodates one or plural units of filtration medium 114 therein. Alternatively speaking, according to the examples above, the first material treatment system 110 may include just one housing 112 (either the first housing 112a, the second housing 112b, or the third housing 112c), or two housings 112 (a combination of any two of the first housing 112a, the second housing 112b, and the third housing 112c), or three housings (the first housing 112a, the second housing 112b, and the third housing 112c). It is noted that the above examples are for illustrative purposes, and the number of housings is not limited to the shown examples. In other exemplary embodiments, the first material treatment system 110 may include more housings 112, for example, one, two, five, or ten more, in addition to the first housing 112a, the second housing 112b, and the third housing 112c. Further, there may be no separate housings 112, and the one or plural filtration media 114 are configured un-compartmentalized in the first material treatment system 110. In yet other exemplary embodiments, the first material treatment system 110 may also include other material treatment modules (not shown) in addition to the one or plural filtration media 114.

According to some embodiments of the disclosure, the first material treatment system 110 may be connected to a collection tank 130 via a second transfer conduit 160c, wherein the second transfer conduit 160c is connected between, for example, an outflow port 110b of the first material treatment system 110 and the collection tank 130. It is understood that pumps and valves are installed at the various conduits, outflow ports and supply ports at the processing target supply unit 20, the heat exchanger 100, the first material treatment system 110, the collection tank 130, etc. as necessary.

The chemical liquid manufacturing apparatus 10 further includes a second material treatment system 120 which communicates with the first material treatment system 110 either directly or indirectly, for example, by connecting to the collection tank 130 via a third transfer conduit 160d, wherein the third transfer conduit 160d is connected between the collection tank 130 and a supply port 120a, and the second material treatment system 120 includes one or plural filtration media 124; a fourth transfer conduit 160e coupling the second material treatment system 120 to a next processing apparatus or packaging 140, wherein the fourth transfer conduit 160e may be connected to an outflow port 120b of the second material treatment system 120; a recirculating conduit 160f which may be branched from the fourth transfer conduit 160e and is connected to the collection tank 130 for recirculating and supplying the partially-purified processing target to be processed by the second material treatment system 120 again; and a sample detector 150, which is coupled to the second material treatment system 120 for monitoring the impurity contents in the chemical liquid. It is understood that pumps and valves are installed at the various conduits, outflow ports and supply ports at the second material treatment system 120, the next processing apparatus or packaging 140, the sample detector 150, etc. as necessary.

In certain exemplary embodiments of the disclosure, the one or plural filtration media 124 may be compartmentalized and contained in one or plural housings 122, respectively. For example, the second material treatment system 120 may include at least one housing 122 selected from a fourth housing 122a, a fifth housing 122b and a sixth housing 122c, and the at least one housing 122 includes and accommodates one or plural units of filtration medium 124 therein. Alternatively speaking, according to the examples above, the second material treatment system 120 may include one, two, or three housings 122. It is noted that the above examples are for illustrative purposes and the number of housings is not limited to the shown examples. In other exemplary embodiments, the second material treatment system 120 may include more housings 122, for example, one, two, five, or ten more, in addition to the fourth housing 122a, the fifth housing 122b and the sixth housing 122c. Further, there may be no separate housings 122, and the one or plural filtration media 124 are configured un-compartmentalized in the second material treatment system 120. In yet other exemplary embodiments, the second material treatment system 120 also may include other unillustrated material treatment modules, in addition to the one or plural filtration media 124.

In some exemplary embodiments, the first material treatment system 110 may also include a recirculation conduit 160h for recirculating the partially-purified processing target back to the first material treatment system 110 and to be processed by the first material treatment system 110 again. Although in the examples as shown in FIG. 1, the recirculation conduit 160h is branched from a fifth transfer conduit 160i configured at the upstream side of the outflow port 110b of the first material treatment system 110, it is noted that the above examples are for illustrative purposes and are not intended to be limiting. In other examples, the recirculation conduit 160h may be configured at the downstream side of the outflow port 110b, as long as it is configured upstream of the collection tank 130 and/or the second material treatment system 120. Further, the recirculation conduit 160h may be connected to the introduction conduit 160a at the upstream side of the heat exchanger 100, or to the first transfer conduit 160b at the downstream side of the heat exchanger 100, or to the supply port 110a of the first material treatment system 110.

Still referring to FIG. 1, in accordance to some embodiments, the chemical liquid manufacturing apparatus 10 is configured to have the first material treatment system 110 positioned upstream of the second material treatment system 120, wherein the processing target passes through or is processed by the first material treatment system 110 first, followed by the second material treatment system 120. However, in alternative embodiments, the chemical liquid manufacturing apparatus 10 may also be configured to have the second material treatment system 120 positioned upstream of the first material treatment system 110 so that the processing target passes through or is processed by the second material treatment system 120 first, followed by first material treatment system 110.

In certain embodiments, the first material treatment system 110 is configured for an in-line single pass. More particularly, in the situation at which the chemical liquid manufacturing apparatus 10 is configured to have the first material treatment system 110 positioned upstream of the second material treatment system 120, the processing target is processed by or passes through the first material treatment system 110 once, and is discharged into the collection tank 130 before proceeding to the second material treatment system 120 or is conveyed to the second material treatment system 120 directly bypassing the collection tank 130. According to certain exemplary embodiments of the disclosure, for an in-line single pass, the first material treatment system 110 includes one unit of the filtration medium 114 selected from the first filtration medium 114a, the second filtration medium 114b, the third filtration medium 114c, and any combination thereof. In other words, the first material treatment system 110, configured for a single in-line process, may include one unit of the first filtration medium 114a, one unit of the second filtration medium 114b, or one unit of the third filtration medium 114c; or one unit of the first filtration medium 114a and one unit of the second filtration medium 114b; or one unit of the first filtration medium 114a and one unit of the third filtration medium 114c; or one unit of the second filtration medium 114b and one unit of the third filtration medium 114c; or one unit of the first filtration medium 114a, one unit of the second filtration medium 114b, and one unit of the third filtration medium 114c. The first material treatment system 110 is configured to have the processing target to pass through and be processed by the one unit of the filtration medium 114 selected from the first filtration medium 114a, the second filtration medium 114b, the third filtration medium 114c, and any combination thereof, before delivering the processing target to the second material treatment system 120.

However, the present disclosure is not limited as such. In alternative embodiments, the first material treatment system 110 may also be configured for a recirculation of plural passes. It is noted that the number of times the processing target to be processed by the first material treatment system 110 is not limited, as long as the processing by the first material treatment system 110 is completed before the processing target is delivered to the second material treatment system 120 or the next stage of processing. In some exemplary embodiments, the first material treatment system 110 is configured for recirculation and to process the processing target for more than one time. If first material treatment system 110 is configured for recirculation to process the processing target more than once, for example twice, the first material treatment system 110 may include two units of filtration medium 114 selected from the first filtration medium 114a, the second filtration medium 114b, the third filtration medium 114c, and any combination thereof. In other words, the first material treatment system 110 may include two units of the first filtration medium 114a, two units of the second filtration medium 114b, or two unit of the third filtration medium 114c; or two units of the first filtration medium 114a and two units of the second filtration medium 114b; or two units of the first filtration medium 114a and two units of the third filtration medium 114c; or two units of the second filtration medium 114b and two units of the third filtration medium 114c; or two units of the first filtration medium 114a, two units of the second filtration medium 114b, and two unit of the third filtration medium 114c. The first material treatment system 110 is configured to have the processing target to pass through one of the two units of the filtration medium 114 selected from the first filtration medium 114a, the second filtration medium 114b, the third filtration medium 114c, and any combination thereof, then recirculate to pass through another unit of filtration medium 114 selected from the first filtration medium 114a, the second filtration medium 114b, the third filtration medium 114c and any combination thereof, and subsequently proceed to the second material treatment system 120 or the next stage of processing. In addition, the recirculation operated by the first material treatment system 110 may be continuous and controlled by, for example, a CPU (central processing unit). However, in some alternative embodiments, the first material treatment system 110 may be configured to recirculate through the same one unit of the filtration medium 114 (114a, 114b, 114c, or any combination thereof).

In accordance to the embodiments of the chemical liquid manufacturing apparatus as shown in FIG. 1, the second material treatment system 120 is adopted for a continuous recirculation of plural times. However, it is noted that the second material treatment system 120 also may be configured to have the processing target material to pass through or be processed by the second material treatment system 120 just once. The number of times that the second material treatment system 120 is configured for recirculation is not particularly limited, and may vary in accordance with the conditions of the processing target such as the initial degree of impurity and contamination, and the purity requirements of the chemical liquid. In certain embodiments of the present disclosure, the second material treatment system 120 is configured for recirculation and to treat the processing target of at least two times. When the processing target is to be processed by the second material treatment system 120 more than once, for example two, three, four, or ten times, the processing target is recirculated, via the recirculating conduit 160f, back to the second material treatment system 120 for the additional processing. In some embodiments, the processing target is recirculated to the collection tank 130, which further delivers the processing target to the second material treatment system 120. In some examples, the processing target may exit the second material treatment system 120, for example, via the outflow port 120b of the second material treatment system 120, and be recirculated, via the recirculating conduit 160f, to the collection tank 130 or to the second material treatment system 120 directly. In other unillustrated examples, the processing target may be recirculated at or the upstream side of the outflow port 120b of the second material treatment system 120, via the recirculating conduit 160f, to the collection tank 130 or the second material treatment system 120 directly.

Similar to the first material treatment system 110, when the second material treatment system 120 is configured to treat or process the processing target for more than once, a fresh unit of the filtration medium 124 (for example, a fresh unit of filtration medium 124 selected from the fourth filtration medium 124a, the fifth filtration medium 124b, the sixth filtration medium 124c, and any combination thereof) may be used for each pass. For example, when the processing target is to be recirculated and treated by the second material treatment 120 of two times or more, the second material treatment system 120 comprises two or more units of the filtration medium 124 (selected from the fourth filtration medium 124a, the fifth filtration medium 124b, the sixth filtration medium 124c, and any combination thereof). Moreover, the two or more units of the filtration medium 124 selected from the fourth filtration medium 124a, the fifth filtration medium 124b, the sixth filtration medium 124c, and any combination thereof may be concurrently configured in the second material treatment system 120, and the processing target is controlled, for example by a CPU, to be processed by a fresh unit of the filtration medium 124 (selected from the fourth filtration medium 124a, the fifth filtration medium 124b, the sixth filtration medium 124c, and any combination thereof) each time to achieve a continuous recirculation. For example, two, three or four units of the filtration medium 124 (selected from the fourth filtration medium 124a, the fifth filtration medium 124b, the sixth filtration medium 124c and any combination thereof) may be concurrently configured in the second material treatment system 120 to achieve a continuous recirculation or processing of the processing target of two, three or four times, respectively. It is noted that the number of units of the filtration medium 124 (124a, 124b, 124c, or any combination thereof) and the number of times of recirculation described above are merely examples and are not intended to be limiting. In some alternative embodiments, one or two units of the filtration medium 124 (124a, 124b, 124c, or any combination thereof) are provided, and the same one or two units of the filtration medium 124 (124a, 124b, 124c, or any combination thereof) are used for the recirculation of multiple times.

The second material treatment system 120 is also configured to allow a sample of the chemical liquid to be tested by a sample detector 150, for example, in-situ by an in-line particle counter, at the end of each pass of the material treatment process performed by the second material treatment system 120. In certain examples, the sample may be collected and delivered, via the sampling conduit 160g, to the sample detector 150, where the number of unwanted particulates (particles) remained in the chemical liquid and the content of metallic impurities are measured by the methods described below. If the number of unwanted particulates (particles) and the amount of metallic impurities detected in the sample are not within the desired predetermined ranges, the chemical liquid is caused to recirculate and be processed by the second material treatment system 120 again. As soon as a high purity chemical liquid is produced with the number of particles and the amount of metallic impurities in the chemical liquid secured within the predetermined ranges, the recirculation through or the processing by the second material treatment system 120 is terminated, and the chemical liquid is either transported to packaging or a next stage of processing 140 via the fourth transfer conduit 160e connected to the outflow port 120b of the second material treatment system 120.

In accordance to some embodiments of the present disclosure, the first material treatment system 110 may include at least one housing 112 selected from the first housing 112a, the second housing 112b and the third housing 112c, and each of the selected housing(s) 112 includes or accommodates one or more units of the filtration medium 114 (114a, 114b, 114c) therein. More particularly, the first housing 112a may include one or plural units of the first filtration medium 114a, the second housing 112b may include one or plural units of the second filtration medium 114b, the third housing 112c may include one or plural units of the third filtration medium 114c, wherein the first, second and third filtration media 114a, 114b and 114c may be different in functionality or property, and offer different treatments to the processing target, while the one or more units of the filtration medium 114 (114a, 114b, 114c) accommodated in each of the selected housings 112 (112a, 112b, 112c), respectively, have the same or similar purification function, physiochemical properties, pore size and/or construction material, etc.

Also, in accordance to some embodiments of the present disclosure, the second material treatment system 120 may include at least one housing 122 selected from a fourth housing 122a, a fifth housing 122b, a sixth housing 122c, and each of the selected housing(s) 122 includes or accommodates one or more units of the filtration media 124 (124a, 124b, 124c) therein. More particularly, the fourth housing 122a may include one or plural units of the fourth filtration medium 124a, the fifth housing 122b may include one or plural units of the fifth filtration medium 124b, the sixth housing 122c may include one or plural units of the sixth filtrations medium 124c, wherein the fourth filtration medium 124a, the fifth filtration medium 124b, and the sixth filtration medium 124c may be different in functionality or property, and offer different treatments to the processing target, while the one or more units of the filtrations medium 124 (124a, 124b, 124c) accommodated in each of the selected housings 122 (122a, 122b, 122c), respectively, have the same or similar purification function, physiochemical properties, pore size and/or construction material, etc.

In accordance to some exemplary embodiments of the present disclosure, the first material treatment system 110 is a multistage system configured to have the processing target material cascading through the replaceable filtration media 114 (114a, 114b, 114c,) that are concatenated together, each having a specific purification function and providing a specific treatment. For example, the first material treatment system 110 may include at least one filtration medium 114 (114a, 114b or 114c) selected from a particle removal filter, an ion exchange membrane and an ion adsorption membrane. In certain exemplary embodiments of the disclosure, there are at least one unit of the selected filtration medium 114. As an example, the first material treatment system 110 may include one particle removal filter, one ion exchange membrane, and one ion adsorption membrane accommodated in the first housing 112a, the second housing 112b, and the third housing 112c, respectively. In another example, the first material treatment system 110 may include two units of particle removal filter and two units of ion adsorption membrane accommodated in the second housing 112b and the third housing 112c, respectively. In yet another example, the first material treatment system 110 may include one unit of ion exchange membrane and one unit of ion adsorption membrane accommodated in the first housing 112a and the second housing 112b, respectively. It is noted that the above examples are for illustrative purposes and are not intended to be limiting.

Similarly, the second material treatment system 120 is a multistage system configured to have the processing target material cascading through replaceable filtration media 124 (124a, 124b, 124c) that are concatenated together, each having a specific purification function and providing a specific treatment. For example, the second material treatment system 120 may include at least one filtration medium 124 (124a, 124b, 124c) selected from a particle removal filter, an ion exchange membrane and an adsorption membrane. In certain embodiments of the disclosure, there are at least two units of the selected filtration medium 124. In some exemplary embodiments of the disclosure, there are three or more units of the selected filtration medium 124, for example, three, four, five or ten units. As an example, the second material treatment system 120 may include three particle removal filters accommodated in the fourth filter housing 122a, and three ion exchange membranes or three ion adsorption membranes accommodated in the fifth filter housing 122b. In another examples, the second material treatment system 120 may include two, three or four particle removal filters accommodated in the fourth filter housing 122a and another two, three or four particle removal filters accommodated in the fifth filter housing 122b, wherein the particles removal filters in the two housings 122a, 122b are different in terms of pore size and/or construction material; for example, the particle removal filters in the two housings 122a, 122b may include filters having a pore size of 10 nm or less, but completely different construction materials. In some examples, the particle removal filters in the two housings 122a, 122b may include, respectively, 3 nm ultra-high molecular weight polyethylene membrane (UPE) filters and 1 nm UPE filters, or respectively 5 nm MPTFE (modified polytetrafluoroethylene) filters and 5 nm nylon filters. In some exemplary embodiments, the second material treatment system 120 may include two or more units of the particle removal filter currently accommodated in a filter housing 122 to allow for a continuous recirculation or a processing of the processing target of two or more times, and a fresh unit of the particle removal filter is used for each time of the recirculation. For example, the two or more particle removal filters can be three units of the 3 nm UPE filter or three units of the 5 nm Nylon filter for the recirculation and treatment of the processing target of three times. Of course, the above examples are for illustrative purposes and are not intended to be limiting.

It should be noted that the number of units of the filtration medium 114, 124 and the number of housings 112, 122 shown and discussed are representative and kept at a low number for the sake of simplicity in both the drawings and description.

It should also be noted that the number and the arrangement sequence of the filtration media 114 (114a, 114b, 114c, or a combination thereof) and of the filtration media 124 (124a, 124b, 124c or a combination thereof), or the flow sequence of the processing target through the above filtration media 114 and 124 is not particular limited, and may vary in accordance with the functionality of the filtration media, the initial condition of the processing target, and the purity requirements of the chemical liquid. In some exemplary embodiments of the present disclosure, the material treatment systems 110 and 120 are configured to have a particle removal filter positioned at the upstream side of an ion-exchange filter which is at the upstream side of an ion adsorption membrane for the processing target to pass through or be processed by the particle removal filter first, then proceed to the ion-exchange membrane, and further continue to the ion adsorption membrane. However, in other exemplary embodiments, the filtration media 114 and the filtration media 124 are configured in other sequences in the material treatment systems 110 and 120, respectively, to have the processing target to pass through or be processed by the filtration media 114 and the filtration media 124 in other sequences, such as an ion-exchange membrane first, followed by a particle removal filter. In some embodiments of the disclosure, the material treatment systems 110 may include more filtration media 114 having the non-sieving property (for example, more ion exchange membranes and/or ion absorption membranes), whereas the material treatment system 120 may include more filtration media 124 having the pure sieving property (for example, more coarse particle filters). It should be appreciated that the arrangement sequences of the filtration media 114 and the filtration media 124 or the flow sequence of the processing target as exemplified above are for illustrative purposes and are not intended to be limiting.

Moreover, in alternative embodiments, the first material treatment system 110 may include an additional filtration medium or material treatment module that is different, in terms of the type of treatment and functionality, from the first filtration medium 114a, the second filtration medium 114b, or the third filtration medium 114c; similarly, the second material treatment system 120 may include additional filtration medium that is different, in terms of the type of treatment and functionality, from the fourth filtration medium 124a, the fifth filtration medium 124b or the sixth filtration medium 124c. Moreover, the additional filtration medium in the first material treatment system 110 or the second material treatment system may be accommodated in a housing. If the filtration medium 114 (114a, 114b, 114c) includes, for example, a particle removal filter, an ion-exchange membrane or an ion adsorption membrane, the additional filtration medium that is different from the first filtration medium 114a, the second filtration medium 114b, or the third filtration medium 114c may include an organic impurity absorption filter for organic impurities removal, or a dehydration membrane, water absorbent, an aeration replacement device, or a heating device for moisture removal. Similarly, if the filtration medium 124 (124a, 124b, 124c) includes, for example, a particle removal filter, an ion-exchange membrane or an ion adsorption membrane, the additional filtration medium that is different, in terms of treatment and functionality, from the fourth filtration medium 124a, the fifth filtration medium 124b, or the sixth filtration medium 124c may include an organic impurity absorption filter for organic impurities removal, or a dehydration membrane, water absorbent, an aeration replacement device, or a heating device for moisture removal.

Figure 2:
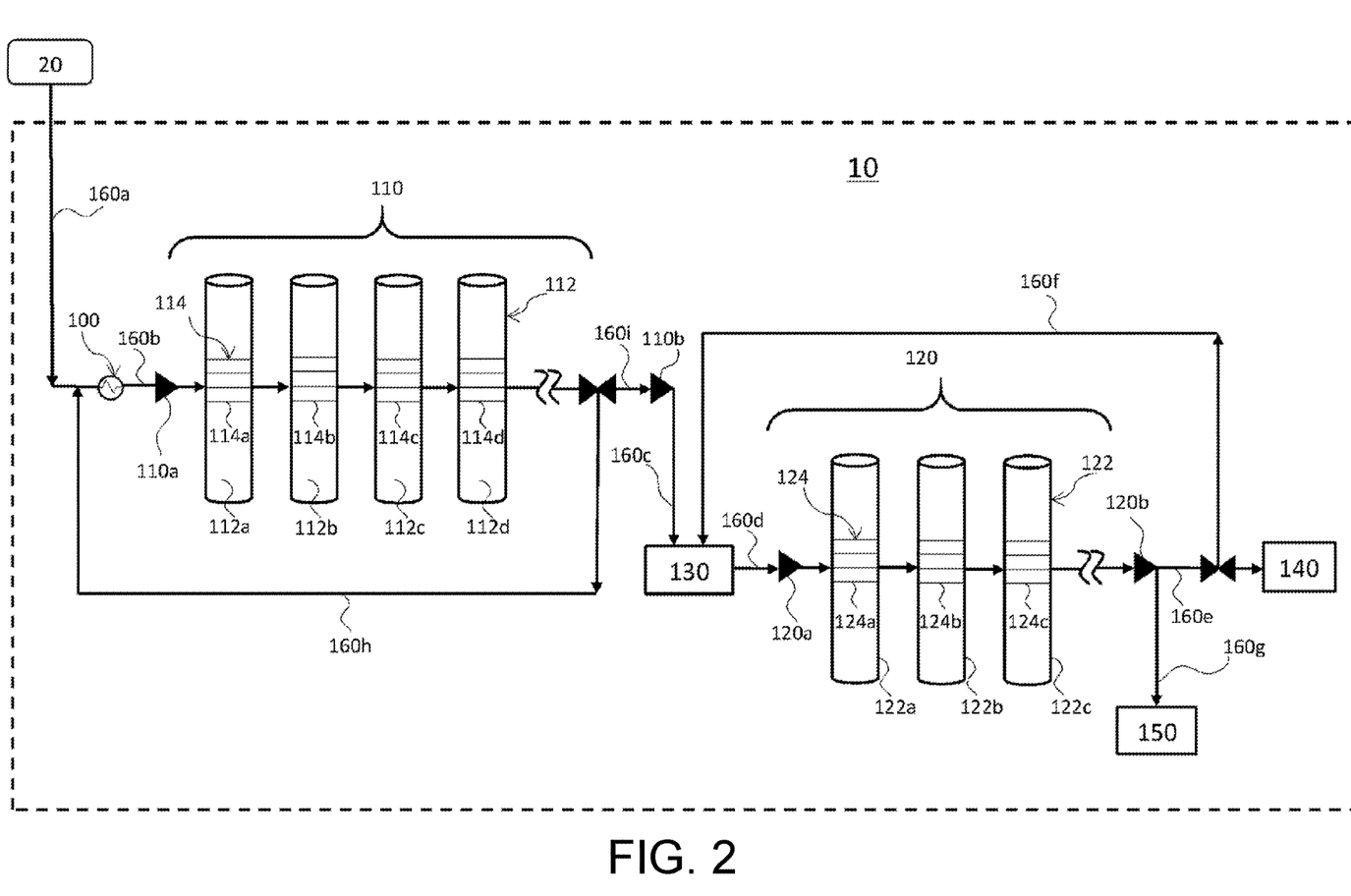
FIG. 2 is a schematic diagram showing a configuration of an exemplary chemical liquid manufacturing apparatus according to some embodiments of the present disclosure.

In certain exemplary embodiments, the first material treatment system 110 may include a filtration medium that has a similar functionality as the first filtration medium 114a, the second filtration medium 114b, or the third filtration medium 114c, but is different from the first filtration medium 114a, the second filtration medium 114b, or the third filtration medium 114c in terms of properties, such as the pore size and/or the construction material. Similarly, the second material treatment system 120 may include a filtration medium that has a similar functionality as the fourth filtration medium 124a, the fifth filtration medium 124b, or the sixth filtration medium 124c, but is different from the fourth filtration medium 124a, the fifth filtration medium 124b, or the sixth filtration medium 124c in terms of the pore size and/or the construction material. For example, as shown in FIG. 2, in addition to the first housing 112a, the second housing 112b, the third housing 112c, the first material treatment system 110 includes a seventh housing 112d to accommodate one or more units of a seventh filtration medium 114d, wherein the seventh filtration medium 114d may be selected from a particle removal filter, an ion exchange membrane, and an ion adsorption membrane. In some examples, the seventh filtration medium 114d may be a 3 nm UPE particle removal filter having a different pore size and/or construction material different from that of a 0.2 PP (50 μm polypropylene membrane) particle removal filter of the first filtration medium 114a. It is noted that the above example is for illustrative purposes, and the type of the seventh filtration medium 114d, and the pore size and material of the seventh filtration medium 114d are not limited to the shown examples. Similarly, in addition to the fourth housing 122a, the fifth housing 122b, the sixth housing 122c, the second material treatment system 120 may include an unillustrated eighth housing to accommodate one or more units of an unillustrated eighth filtration medium, wherein the eighth filtration medium may be selected from a particle removal filter, an ion exchange membrane and an ion adsorption membrane. It is noted that the above examples are for illustrative purposes and are not intended to be limiting.

[Particle Removal Filter]

The particle removing process is a process of removing particles and/or metal impurities (metal impurities in a solid form) in the processing target by using a particle removal filter. The particle removal filter is not particularly limited, and well-known particle removal filters can be used.

Although the average pore size (pore diameter) of the filter is not particularly limited, it is suitably about 0.001 to 1.0 μm (1 nm to 1000 nm), preferably about 0.01 to 0.5 μm (10 nm to 500 nm), and more preferably about 0.01 to 0.1 μm (10 nm to 100 nm). Within this range, it is possible to reliably remove foreign matters such as impurities or aggregates contained in the refined product while suppressing clogging of the filter. In certain embodiments of the disclosure, the first material treatment system 110 may include a particle removal filter having an average pore size as small as 2 nm (for example, microfiltration membrane having a pore size of 2 nm or greater), and may range from 0.002 μm (2 nm) or more to about 1.0 μm (1000 nm) or less. In a case where fine particles are provided in the processing target in addition to colloidalized impurities including metal atoms such as iron or aluminum, the processing target is filtered by using a filter having an average pore size as small as 50 nm to remove particles before filtering is performed by using a filter having average pore size as small as 20 nm or 15 nm to remove finer particles. Thus, the filtration efficiency is improved and performance of removing particles is more improved.

In some embodiments of the disclosure, the second filtration system 120 may include a particle removal filter having a pore size as small as 0.001 μm (1 nm), and may range from about 0.001 μm (1 nm) or more to about 0.015 μm (15 nm) or less. In certain embodiments, the second filtration system 120 may include a UPE filter having a pore size as small as 3 nm. Yet in other embodiments, the second filtration system 120 may include a Nylon or a MPTFE filter having a pore size of about 5 nm. Here, the average pore size can refer to the nominal value of the filter manufacturer.

Examples of the material of the filter used in particle removal include a fluororesin such as polytetrafluoroethylene (PTFE), a polyamide resin such as nylon and the like, a polyolefin resin (including high density and ultrahigh molecular weight) such as polyethylene and polypropylene (PP) and the like, a perfluoroalkoxy (PFA) resin and the like, or a modified polytetrafluoroethylene (MPTFE). In view of efficiently removing fine foreign matters such as impurities and/or aggregates contained in a chemical liquid, the filter used in particle removal of the present disclosure is made of at least one selected from the group consisting of nylon, polypropylene (including high density polypropylene), polyethylene, polytetrafluoroethylene, tetrafluoroethylene-perfluoroalkyl vinyl ether copolymer, polyimide, and polyamide imide. According to the filter made of the above material, it is possible to effectively remove foreign matter having high polarity which is likely to cause residue defects and/or particle defects, and it is possible to efficiently reduce the content of the metal component in the chemical liquid.

Polyimide and/or polyamide imide may have at least one selected from the group consisting of a carboxy group, a salt type carboxy group, and a —NH— bond. Regarding solvent resistance, a fluororesin, polyimide, and/or polyamide imide is excellent.

[Ion-Exchange Resin Membrane (Ion-Exchange Membrane)]

The ion-exchange resin membrane used in the present embodiment is not particularly limited, and filters including an ion-exchange resin comprising a suitable ion-exchange group immobilized to a resin membrane may be used. Examples of such ion-exchange resin membranes include strongly acidic cation-exchange resins comprising a cation-exchange group such as a sulfonic acid group chemically modified on the resin membrane, and examples thereof include cellulose, diatomaceous earth, nylon (a resin having an amide group), polyethylene, polypropylene, polystyrene, a resin having an imide group, a resin having an amide group and an imide group, a fluororesin, or a high-density polyethylene membrane and ion-exchange resin membranes with a particle-removing membrane that is a membrane having an integral structure of a particle-removing membrane and an ion-exchange resin membrane. Polyalkylene membranes with an ion-exchange group chemically modified thereon are preferred. Polyalkylenes include, for example, polyethylene and polypropylene, and polypropylene is preferred. Cation-exchange groups are preferred as the ion-exchange group. Ion-exchange resin membranes used in the present embodiment may be commercially available filters with metal ion removal functionality. These filters are elected based on the ion exchange efficiency and with an estimated pore size of the filters as small as about 0.2 μm (200 nm).

[Ion Adsorption Membrane]

The ion adsorption membrane has a porous membrane material and has an ion exchange function. Such ion adsorption membrane is not particularly limited as long as it has a pore diameter of 100 μm or less and has an ion exchange function. The material, the type and the like thereof are not particularly limited. Examples of the material of a base material constituting the ion adsorption membrane include, but not limited to, cellulose, diatomaceous earth, film material of microfiltration membrane such as nylon (resin having amide group), polyethylene, polypropylene, polystyrene, resin having imide group, resin having amide group and imide group, fluororesin, or high density polyethylene resin, a membrane material having an ion exchange ability functional group introduced therein, or the like. Examples of the shape of the membrane material include a pleated type, a flat membrane type, a hollow fiber type, a porous body as described in JP-A No. 2003-112060 and the like. As the ion exchange group to be introduced into the membrane material, it is preferable to use a combination of at least two of the cation exchange group, the chelate exchange group, and the anion exchange group to optimize the elution and selectivity of the components to be removed. Since the ion adsorption membrane has porosity, it is also possible to remove a part of the fine particles. In certain embodiments of the disclosure, the ion adsorption membrane is, for example, a nylon membrane having a pore diameter as small as 0.02 μm (20 nm).

In the process for preparing a chemical liquid in the present embodiment, the ion-exchange resin membrane or ion adsorption membrane are brought into contact with an organic solvent in advance. There is a commercially available product in a dry state of the ion-exchange resin membrane or ion adsorption membrane. Further, there is also a hydrophilic material having a high level of affinity for aqueous solutions. In the present embodiment, even when such ion-exchange resin membranes or ion adsorption membranes are used, a preliminary contact with an organic solvent allows metal impurities in the untreated chemical liquid to be effectively removed and the reduction effect is significantly superior to the case of the ion-exchange resin membrane or ion adsorption membrane having not been brought into contact with the organic solvent in advance.

[Manufacturing Method of Chemical Liquid]

An exemplary method for manufacturing a chemical liquid includes providing a chemical liquid manufacturing apparatus having at least a first material treatment system 110 and a second material treatment system 120. The first material treatment system 110 includes one or plural first filtration media 114; and when the first material treatment system 110 includes plural first filtration media 114, at least two of first filtration media 114 are different in function, pore size and/or construction material. The second material treatment system 120 includes one or plural second filtration media 124; and when the second material treatment system 120 includes plural second filtration media 124, at least two of second filtration media 124 are different in functionality, pore size and/or construction material. The method for manufacturing a chemical liquid also includes delivering a processing target to the first material treatment system 110; processing the processing target by the one or plural first filtration media 114 in the first material treatment system 110 for one time; optionally recirculating the processing target through and be processed by the first material treatment 110 system again. The manufacturing method also includes delivering the processing target to the second material treatment system 120; processing the processing target by the one or plural second filtration media 124 in the second material treatment system 120; recirculating the processing target so that the processing target is processed by the second material treatment 120 system for at least two times. The manufacturing method further includes collecting a sample of the chemical liquid by a sample detector 150, for example, in-situ by an in-line particle counter 150, at the end of each processing of the second material treatment system 120, and measuring the number of particles and the content of metallic impurities remained in the chemical liquid. If the number of particles and the amount of metallic impurities detected in the sample are above the desired predetermined ranges, the chemical liquid is caused to be recirculated and processed by the second material treatment system 120 again. As soon as the sample detected by the particle counter 150 to have the number of particles and the amount of metallic impurities secured within the predetermined ranges and a high purity chemical liquid is produced, the recirculation through or the processing by the second material treatment system 120 is terminated, and the chemical liquid is transported either to packaging or a next stage of processing 140.

According some embodiments of the disclosure, it is preferable not to use reverse osmosis membranes (RO filter) as used in aqueous solvents.

EXAMPLES

The present disclosure will be more specifically described below based on the following examples. A material, a use amount, a ratio, treatment details, treatment procedures, and the like which will be described the following examples can be appropriately changed in a range without departing from the gist of the present invention. Accordingly, the range of the present disclosure should not be interpreted restrictively by the following examples. "ppt", "ppb", and "ppm" are based on the mass, so long as particular statements are not made.

<Preparation of Chemical Liquids>

The chemical liquid in the examples was cyclohexanone, and was prepared by subjecting raw cyclohexanone (pre-processed cyclohexanone or the processing target) to the chemical liquid manufacturing apparatus of the present disclosure.

The arrangement, the selection of the filtration medium 114 in the first material treatment system 110 (Unit A) and the filtration medium 124 in the second material treatment system 120 (Unit B), such as the functionality, the pore size, the construction material and/or the number of units of the filtration medium 114 and filtration medium 124, and the number of times of the raw cyclohexanone passing through the selected filtration medium 114 and the selected filtration medium 124 were adjusted to prepare a chemical liquid having a composition in each of the examples.

<Wafer Map, OWPC, OWMC, Defect Evaluation>

Each chemical liquid sample was collected and then inserted into a wafer coating tool. After a bare wafer is coated with a sample, the wafer was transferred to and inspected by a laser-based inspection system. By using a laser light, the laser-based inspection system detected, counted, recorded the location and sizes each particle on the wafer, at a detection limit of 19 nm. More specifically, counting targets included particles having a size of 19 nm or greater. The data was used to create wafer maps and provide the total on-wafer particle counts (OWPC).

The wafer was then transferred to be inspected by EDX (energy dispersive x-ray). Each particle reported by the laser-based inspection system was inspected by EDX (energy dispersive x-ray) for providing the elemental information. Any particle, which was found to produce any metal signal, was counted as a metal particle. The total number of particles with a metal signature was totalized to report as OWMC (on-wafer metal count).

<Total Trace Metal (ppb)>

Each chemical liquid sample was tested using ICP-MS (inductively coupled plasma mass spectrometry (ICP-MS). Using a Fujifilm developed method, each sample was tested for the presence of 26 metal species, the detection limit was metal specific, but the typical detection limits were in the range of 0.00010-0.030 ppb. The concentration of each metal species was then totalized to produce the value shown as total trace metal (ppb).

<Liquid Particle Count LPC (>0.05 um)>

Each sample was tested using a liquid particle counter. This instrument used a laser light to count and size the particles in the liquid sample, with a detection limit down to 0.05 um. The reported value has the unit of "particles/ml".

<Evaluation Results>

As shown in Table 1, each example was prepared by the chemical liquid manufacturing apparatus of the present disclosure, except that the chemical liquid manufacturing apparatus was configured differently to process the raw material (processing target) of each example. The different configurations of the chemical liquid manufacturing apparatus for processing the raw material (raw cyclohexanone) were designated as various processes W, X, Y, and Z as summarized in Table 1. A raw material (raw cyclohexanone) was served as a baseline sample.

TABLE 1

| Process | Unit A Type of medium and size | Unit B Type of medium and size |
|---|---|---|
| W | At least 3 distinct stages of filtration using a combination of ion absorption and particulate filters with pore sizes ranging from 0.003 um to 0.500 um. Membrane materials of construction including polypropylene, polyethylene and nylon. Filters can be used for multiple process cycles. | At least 2 distinct stages of filtration using ion absorption and particulate filters with pore size up to 0.005 um. Membrane materials of construction including polyethylene, nylon and PTFE. Filters can be used for multiple process cycles. |
| X | At least 3 distinct stages of filtration using a combination of ion absorption and particulate filters with pore sizes ranging from 0.020 um to 0.500 um. Membrane materials of construction including polypropylene, polyethylene and nylon. Filters can be used for multiple process cycles. | At least 1 distinct stage of filtration using ion absorption or and/or particulate filter with pore size up to 0.005 um. Membrane materials of construction including polyethylene and nylon. Filters can be used for multiple process cycles. |
| Y | At least 3 distinct stages of filtration using a combination of ion absorption and particulate filters with pore sizes ranging from 0.020 um to 0.500 um. Membrane materials of construction including polypropylene, polyethylene and nylon. Filters can be used for multiple process cycles. | At least 1 distinct stage of filtration using particulate filter with pore size up to 0.003 um. Membrane materials of construction of polyethylene. Filters can be used for multiple process cycles. |
| Z | At least 3 distinct stages of filtration using a combination of ion absorption and particulate filters with pore sizes ranging from 0.020 um to 0.500 um. Membrane materials of construction including polypropylene, polyethylene and nylon. Filters can be used for multiple process cycles. | At least 1 distinct stage of filtration using particulate filter with pore size up to 0.003 um. Membrane materials of construction of polyethylene. Filters can be used for multiple process cycles. |

In another embodiment, Example W-1 was produced in the same manner as in Example W except that the filter having the smallest pore size (pore size is smaller than 10 nm) was placed at the most upstream side of the unit A, the number of LPC, OWPC, and OWMP are smaller than that of Example W.

In another embodiment, Example W-2 was produced in the same manner as in Example W except that the filter having the largest pore size (pore size is larger than 50 nm) was placed at the most upstream side of the unit A, the number of LPC, OWPC, and OWMP are smaller than that of Example W.

The same tendency is obtained when changed to the solvent which is selected from the group consisting of methanol, ethanol, 1-propanol, isopropanol, monomethyl ether, propylene glycol monomethyl ether, propylene glycol monoethyl ether, propylene glycol monopropyl ether, propylene glycol monomethyl ether acetate, ethyl lactate, methyl methoxypropionate, cyclopentanone, cyclohexanone, γ-butyrolactone, diisoamyl ether, butyl acetate, 4-methyl-2-pentanol, and a combination thereof. Among them, better performance is obtained when cyclohexanone, PGMEA, butyl acetate, propylene glycol monomethyl ether acetate, isopropanol is used, and even better performance is obtained when cyclohexanone is used.

The various evaluations were performed. Tables 2-4 collectively show the results.

TABLE 2

| | Example 1 - (standard material) | | Example 2 - (high TM material) Process | | Example 3 - |
|---|---|---|---|---|---|
| | Y (Input) | Y (Output) | Z (Input) | Z (Output) | Ave W Output |
| Total Metals in ppb | 1.4044 | 0.6947 | 114.7259 | 1.1487 | 0.1837 |

TABLE 3

| Reduction in LPC's | | | | | |
|---|---|---|---|---|---|
| RION KS-18F Instrument (Particle Bin Sizes) | Raw Material Baseline | Y | Z | X | W |
| PC at 0.05 | 72115 | 592 | 281 | 54 | 39.3 |
| PC at 0.10 | 26814 | 83 | 36 | 13 | 12 |

TABLE 3-continued

Reduction in LPC's

| RION KS-18F Instrument (Particle Bin Sizes) | Raw Material Baseline | Y | Z | X | W |
|---|---|---|---|---|---|
| PC at 0.15 | 14707 | 23 | 9 | 5.7 | 6.3 |
| PC at 0.2 | 98920 | 23 | 8 | 3.7 | 3.3 |
| Total Particles | 122556 | 721 | 334 | 76.4 | 60.9 |

TABLE 4

On-Wafer Defectively

| Sample | OWPC (on wafer particle count) >17 nm | OWMP (on wafer metal particle count) >17 nm |
|---|---|---|
| Raw Material (Baseline) | 149,811 | 16,646 |
| X | 597 | 43 |
| W | 126 | 1 |

The W, X, Y, Z samples were demonstrated to be more desirable in the tested attributes, such as reductions in metal trace, LPC, OWPC, and OWMP. The W, Y, Z samples were shown to have less total metal trace. As shown in Table 2, the chemical liquids, prepared by the chemical liquid manufacturing apparatus 10 of the present application, were shown to have achieved the desired advantages of significantly reducing the total trace metal counts as demonstrated by the output of each process, comparing with the input of each process. More specifically, the W sample was shown to have a total metal trace of 0.1837.

The results summarized in Table 3 also confirmed that the total liquid particle counts (LPC) were significantly reduced in the chemical liquids prepared by the chemical liquid manufacturing apparatus 10 of the present disclosure. Comparing to the baseline sample, in which the LPC was 122556, the LPCs of X and W samples were less than 100, and were 76.4 and 60.9, respectively.

As shown in Table 4, the baseline sample was shown to be significantly high in both OWPC (149,811) and OWMP (16,646). On the other hand, the chemical liquids prepared by the chemical liquid manufacturing apparatus 10 of the present disclosure were demonstrated to have achieved the desired advantages of having very low counts in OWPC and OWMP. The OWPCs for the X and W samples were 597 and 126, receptively, while the OWMPs for the X and W samples were 43 and 1, respectively.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A chemical liquid manufacturing apparatus, comprising:
a first system configured to process a material, the first system comprising at least one first filtration medium and a moisture removal device, the at least one first filtration medium is selected from the group consisting of a first filter, a first ion exchange membrane and a first ion adsorption membrane, the moisture removal device is selected from the group consisting of a dehydration membrane, water absorbent, an aeration replacement device and a heating device, and wherein the first system is configured to process the material at least one time; and
a second system configured to process the material, the second system comprising at least one second filtration medium and a second moisture removal device, the at least one second filtration medium is selected from the group consisting of a second filter, a second ion exchange membrane and a second ion adsorption membrane, the second moisture removal device is selected from the group consisting of a dehydration membrane, water absorbent, an aeration replacement device and a heating device, and wherein the second system is configured for a recirculation and to process the material at least two times.

2. The chemical liquid manufacturing apparatus of claim 1, wherein the first system is positioned at an upstream side of the second system so that the material is processed by the first system before being processed by the second system.

3. The chemical liquid manufacturing apparatus of claim 1, wherein the first system is configured for a single pass.

4. The chemical liquid manufacturing apparatus of claim 1, wherein the at least one second filtration medium comprises the second filter, and the second filter being a pure sieving filter having a pore size of about 10 nm or less.

5. The chemical liquid manufacturing apparatus of claim 1, wherein the at least one first filtration medium comprises the first filter, and a pore size of the first filter is about 50 nm or more.

6. The chemical liquid manufacturing apparatus of claim 1, wherein the at least one first filtration medium comprises the first filter, and a pore size of the first filter is about 15 nm or more.

7. The chemical liquid manufacturing apparatus of claim 1, wherein the at least one first filtration medium comprises the first ion exchange membrane or the first ion adsorption membrane.

8. The chemical liquid manufacturing apparatus of claim 1 further comprising an in-line particle counter.

9. A chemical liquid manufacturing apparatus for processing a material, comprising:
a first system comprising at least one first filtration medium and a moisture removal device, the at least one first filtration medium is selected from the group consisting of two first filters having different properties, a first ion exchange membrane and a first ion adsorption membrane, the moisture removal device is selected from the group consisting of a dehydration membrane, water absorbent, an aeration replacement device and a heating device, and wherein the first system is configured to process the material at least one time; and
a second system comprising at least one second filtration medium and a second moisture removal device, the at least one second filtration medium is selected from the group consisting of at least one second filter, a second ion exchange membrane and a second ion adsorption membrane, the second moisture removal device is selected from the group consisting of a dehydration membrane, water absorbent, an aeration replacement device and a heating device, and wherein the second system is configured for a recirculation and to process the material at least two times.

10. The chemical liquid manufacturing apparatus of claim 9, wherein the two first filters are different in at least one of a pore size and a construction material.

11. The chemical liquid manufacturing apparatus of claim 10, wherein one of the two first filters has a pore size of about 50 nm or more.

12. The chemical liquid manufacturing apparatus of claim 10, wherein one of the two first filters has a pore size of about 10 m or less.

13. The chemical liquid manufacturing apparatus of claim 9, wherein the at least one second filter comprises two second filters, and the two second filters have different properties.

14. The chemical liquid manufacturing apparatus of claim 13, wherein the two second filters are different in at least one of a pore size and a construction material.

15. The chemical liquid manufacturing apparatus of claim 13, wherein at least one of the two second filters is a pure sieving filter having a pore size of about 10 nm or less.

16. The chemical liquid manufacturing apparatus of claim 9, wherein the first system is positioned at an upstream side of the second system.

17. The chemical liquid manufacturing apparatus of claim 9, wherein the first system is configured for a single pass.

18. A chemical liquid manufacturing apparatus, comprising:

a first system comprising one or plural first purification media, and when the first system comprising the plural first purification media, at least two of the plural first purification media being different in function, pore size or material, and the first system further comprising a moisture removal device that is selected from the group consisting of a dehydration membrane, water absorbent, an aeration replacement device and a heating device; and a second system comprising one or plural second purification media, and when the second system comprising the plural second purification media, at least two of the plural second purification media being different in function, pore size or material, and the second system further comprising a second moisture removal device that is selected from the group consisting of a dehydration membrane, water absorbent, an aeration replacement device and a heating device, wherein the first system is configured for processing a material at least one time and the second system is configured for a recirculation and to process the material at least two times.

19. The chemical liquid manufacturing apparatus according to claim 18, wherein the one or plural first purification media is selected from the group consisting of a filter, an ion exchange membrane and an ion adsorption membrane.

20. The chemical liquid manufacturing apparatus according to claim 18, wherein the one or plural second purification media is selected from the group consisting of a filter, an ion exchange membrane and an ion adsorption membrane.

* * * * *